US006890256B2

(12) United States Patent
Walker et al.

(10) Patent No.: US 6,890,256 B2
(45) Date of Patent: *May 10, 2005

(54) SYSTEM AND METHOD FOR ADVERTISING/SALES AT A GAMING DEVICE

(75) Inventors: Jay S. Walker, Ridgefield, CT (US); James A. Jorasch, Stamford, CT (US); Thomas M. Sparico, New York, NY (US); Stephen C. Tulley, Fairfield, CT (US); Michael D. Downs, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/112,712

(22) Filed: Mar. 29, 2002

(65) Prior Publication Data

US 2003/0125104 A1 Jul. 3, 2003

(Under 37 CFR 1.47)

Related U.S. Application Data

(63) Continuation-in-part of application No. 09/521,869, filed on Mar. 8, 2000, now Pat. No. 6,390,917, which is a continuation of application No. 08/769,085, filed on Dec. 18, 1996, now Pat. No. 6,186,893.

(51) Int. Cl.[7] .................................................. A63F 9/24

(52) U.S. Cl. .......................................... 463/20; 463/25

(58) Field of Search ................................. 463/1, 12–13, 463/16–20, 25, 29–31, 40–42; 273/138.2, 139, 143 R, 292–293; 700/91–93; 340/323 R; 705/14, 16–18, 26–27, 35, 39

(56) References Cited

U.S. PATENT DOCUMENTS

| 4,745,468 A | 5/1988 | Von Kohorn | 358/84 |
| 4,876,592 A | 10/1989 | Von Kohorn | 358/84 |
| 5,022,172 A | 6/1991 | Kawahara et al. | 40/503 |

(Continued)

OTHER PUBLICATIONS

Poe, Janita, "Promoters confident TV viewers eager to cry 'Bingo!'", Chicago Tribune, May 7, 1992, Section: Chicagoland, p. 1, Zone: C.

Turcsik, Richard, "Recycling–slot machine is tested at A&P unit.", Supermarket News, Dec. 21, 1992, Section: vol. 42, No. 51, p. 17, ISSN: 0039–5803.

Gillen, Marilyn A., "Ads Begin To Pop Up In CD–ROMs; Ads begin in video & games and CD–ROM", Billboard, Mar. 25, 1995, p. 58.

Rich, Laura, "All Aboard the brand train", Inside Media, Mar. 29, 1995, Section: p. 26, ISSN: 1046–5316.

"DCI Telecommunications Inc. Announces Merger Discussion", PR Newswire, Mar. 15, 1996, Section: Financial News.

"Australian Interactive Television Could Include Gambling On Demand", Computergram International, May 2, 1996.

Hilzenrath, David S., "Change Is Good, They Bet", The Washington Post, Oct. 21, 1996, Section: Financial, p. F01.

*Primary Examiner*—Mark Sager
(74) *Attorney, Agent, or Firm*—Michael D. Downs

(57) ABSTRACT

In accordance with one embodiment of the present invention, a method provides for determining data associated with a gaming device; determining whether the data meets at least one established criterion; and providing an offer to a player if the data meets the at least one established criterion, the offer including a condition and an amount of credit to be provided to the player in exchange for the player agreeing to the condition.

40 Claims, 9 Drawing Sheets

U.S. PATENT DOCUMENTS

| | | | |
|---|---|---|---|
| 5,083,271 A | 1/1992 | Thacher et al. | 364/411 |
| 5,259,613 A | 11/1993 | Marnell, II | 273/138 A |
| 5,283,734 A | 2/1994 | Von Kohorn | 364/412 |
| 5,429,361 A | 7/1995 | Raven et al. | 273/138 A |
| 5,470,079 A | 11/1995 | LeStrange et al. | 273/138 A |
| 5,488,411 A | 1/1996 | Lewis | 348/8 |
| 5,697,844 A | 12/1997 | Von Kohorn | 463/40 |
| 5,759,101 A | 6/1998 | Von Kohorn | 463/40 |
| 6,186,893 B1 | 2/2001 | Walker et al. | 463/20 |
| 6,540,609 B1 | 4/2003 | Paige | |

SYSTEM AND METHOD FOR ADVERTISING/SALES AT A GAMING DEVICE

CROSS-REFERENCE TO RELATED APPLICATIONS

This application is a continuation-in-part of U.S. patent application Ser. No. 09/521,869, filed on Mar. 8, 2000, incorporated herein by reference, which issued as U.S. Pat. No. 6,390,917 B1 on May 21, 2002; which is a continuation of U.S. patent application Ser. No. 08/769,085, filed on Dec. 18, 1996 and issued Feb. 13, 2001 as U.S. Pat. Ser. No. 6,186,893, incorporated herein by reference.

FIELD OF THE INVENTION

This invention relates to an apparatus which provides interactive marketing and user response facilities for gaming machines and, more particularly, to a system which selectively provides advertising and purchase information to a user in accordance with predetermined criteria.

BACKGROUND OF THE INVENTION

Modem slot machines are often networked, via a local area network, and typically are centrally controlled from a server. Such a system is capable of handling digital information, both from the server to the individual slot machines and vice-versa. Most slot machines are capable of receiving payment, measuring the amount of payment received and communicating such amount to the server.

DETAILED DESCRIPTION OF EMBODIMENTS

Figure 1:
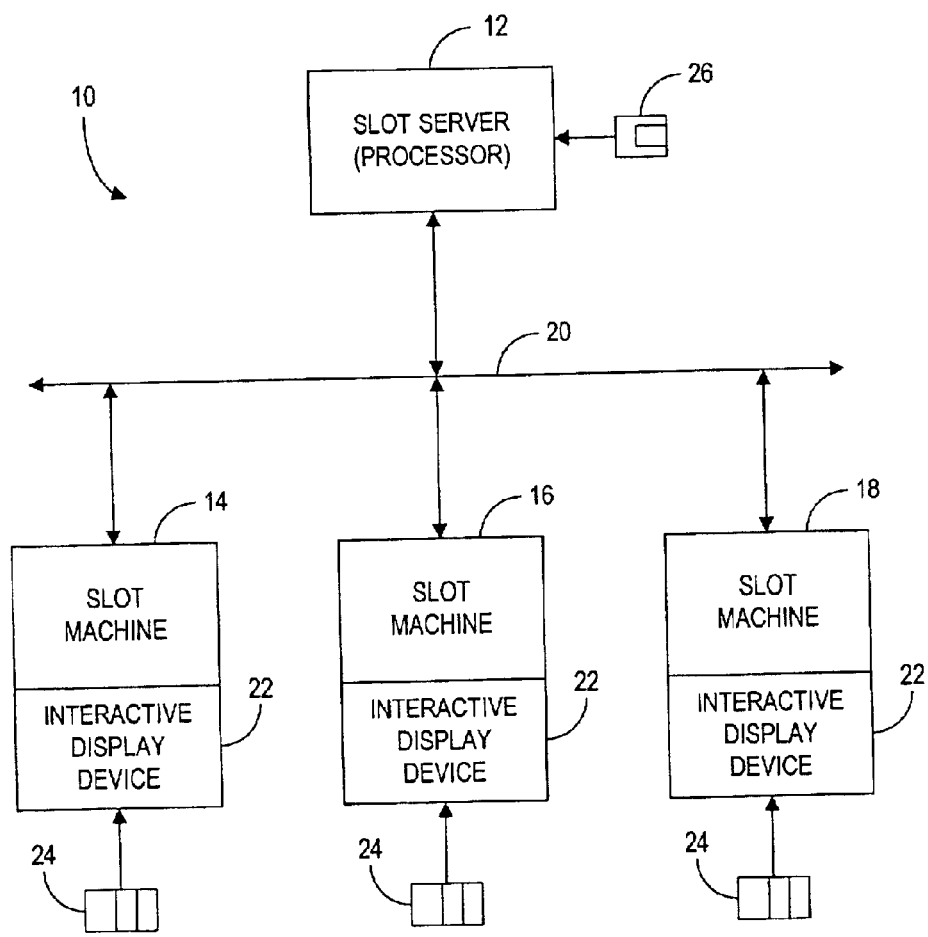
FIG. 1 is a block diagram of a network.

Referring to FIG. 1, a network 10 includes a network server 12, which is connected to a plurality of slot machines 14, 16, and 18, via a bus system 20. Each of slot machines 14, 16, and 18 includes an interactive display device 22, which is adapted to display messages that are either downloaded from network server 12 or are generated locally in the respective slot machine. The slot machines may alternatively be connected to server 12 through an appropriate wireless network.

Note that while only slot machines are indicated in FIG. 1 as being connected to bus system 20, various gaming devices which provide intermittent payouts to a player in response to continued play actions (e.g., reel slot machines, video slot machines, keno devices, bingo devices, video poker devices, video blackjack devices) can be controlled by network server 12 in the same manner. Thus, while the description hereafter will consider "slot machines", it is to be understood that various types of gaming devices are also to be considered within the scope of the invention.

Each interactive display device 22 is provided with means for receiving a player-identity card 24 that typically includes player information, e.g., identity of the player, and may also include further data such as an amount of a line of credit available to the player, an amount of remaining credit available, and player status information (i.e., frequent player, infrequent player, heavy bettor). Each interactive display device 22 further includes key entry inputs (either soft or hard keys) that are made available for use by the player.

Network server 12 includes a transaction processor subroutine which is stored therein or which can be loaded thereinto via a magnetic disk 26. The transaction processor subroutine, in combination with the network server hardware, provides accounting and statistical services for connected slot machines, control and updating of connected databases, and provision of product and product purchase information to the slot machines. The transaction processor subroutine further processes input signals from the players at the respective slot machines.

Figure 2:
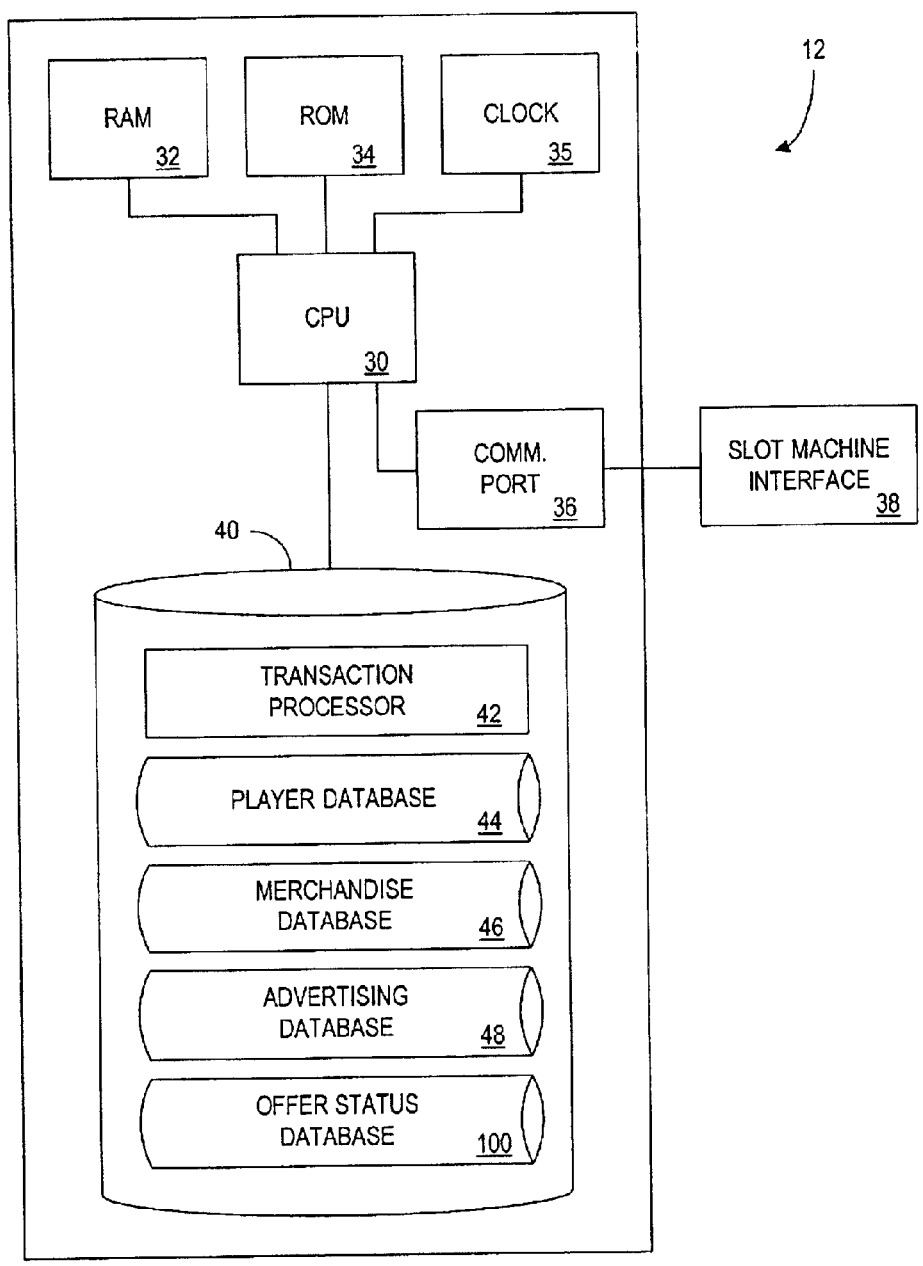
FIG. 2 is a high-level block diagram of a network server.

FIG. 2 illustrates a block diagram of a representative network server 12. Network server 12 includes a central processor unit (CPU) 30 which is coupled to a random access memory (RAM) 32, a read only memory (ROM) 34, a clock 35, and a communication port 36 which provides interconnection to bus system 20 (via slot machine interface 38). A data storage device 40 provides memory capacity for a transaction processor subroutine 42, a player database 44, a product database 46, an advertising database 48, and an offer status database 100. Note that while transaction processor subroutine 42 is indicated as a software driven process, it can also be performed by a dedicated microprocessor, to enhance system performance.

Figure 3:
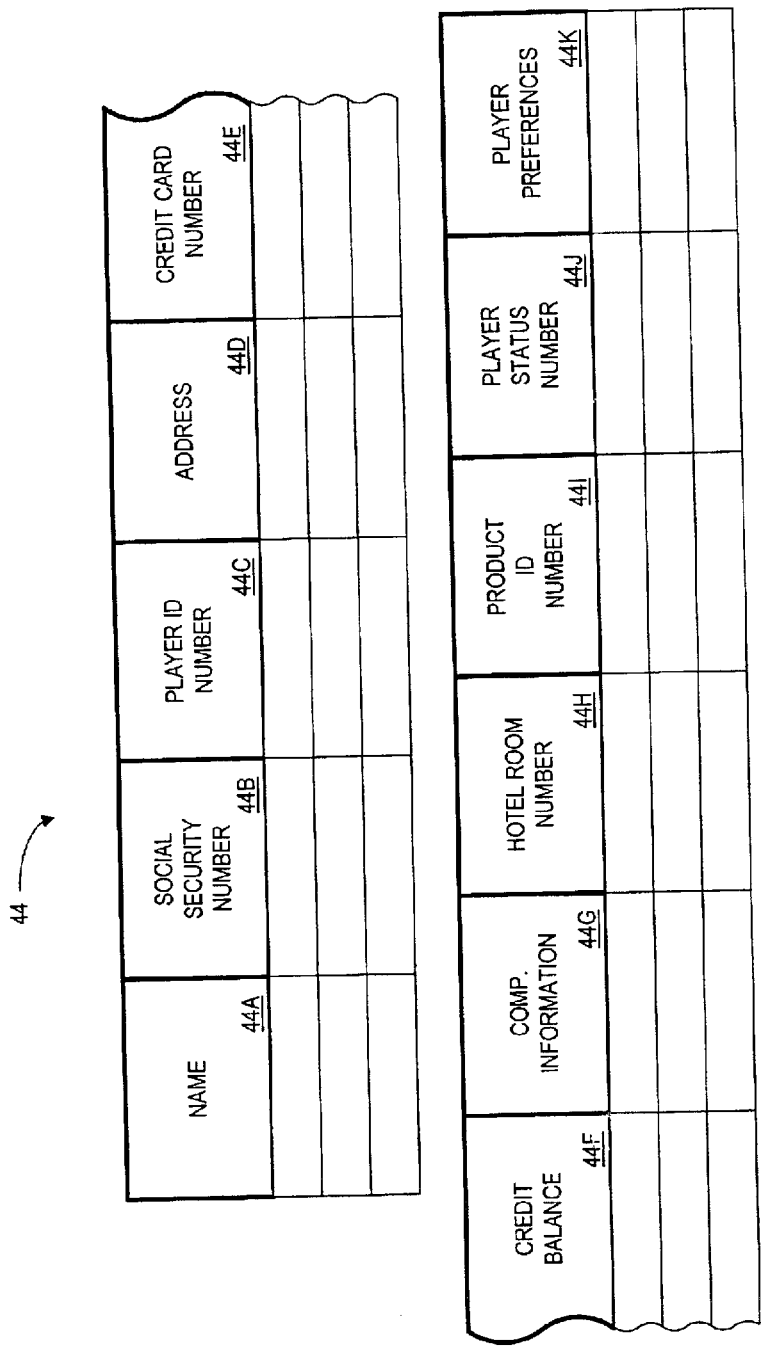
FIG. 3 is a schematic diagram of a player database.

The operation of transaction processor subroutine 42 will be described in detail below in conjunction with the flow diagram of FIG. 7. A schematic showing of the contents of player database 44 is found in FIG. 3 and preferably includes the following data:

Name 44A;
Social Security Number 44B;
Player identification (ID) number 44C;
Address 44D;
Credit card number 44E;
Credit balance 44F;
Complimentary information 44G;
Hotel room number 44H;
Product ID number 44I;
Player status number 44J; and
Player preferences 44K.

Most of the contents of player database 44 are self-explanatory and require no further description. The complimentary information 44G is coded information indicating which services are to be provided to the player, free of charge or at a discount. The product ID number 44I identifies each product that the player has purchased, in a manner to be described below. Finally, the player status number 44J is a value assigned to the player and indicates a status level assigned by the gaming establishment to the player. For instance, the player may be a frequent player and entitled to certain premiums. Further, the player may have been disqualified from further play and this will be indicated by an assigned status number.

An indication of preferences 44K of a player may be stored in the player record of player database 44. For example, a player might prefer particular types of offers, such as those related to sports (e.g., sporting goods, tickets for sporting events). A player might prefer to receive offers with a particular frequency, or at particular times. Indications of such preferences 44K could be stored in player database 44.

In essence, player database 44 provides sufficient information to enable network server 12 to perform the invention hereof without requiring any further data from the player, other than a selection or non-selection of an offered product, service or offering.

Figure 4:
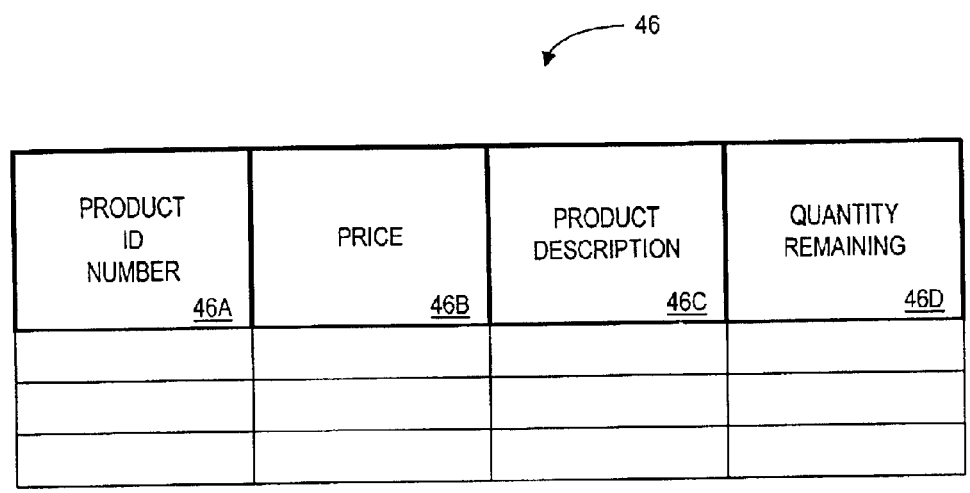
FIG. 4 is a schematic diagram of a product database.

Product database 46 is illustrated, schematically, in FIG. 4 and includes a product ID number 46A; the price of the product 46B; a brief product description 46C; and the quantity of the product remaining 46D. In addition to merchandise, database 46 may include services that are to be offered to players (e.g., tax advice, medical and legal consulting). Further, for example, an offering may be included that will compensate the player for: switching phone service (e.g., AT&T to MCI); switching cable providers; switching Internet service providers; opening up a new credit card account; switching from one credit card to another; taking out a loan from a specified institution; agreeing to speak with a sales representative; or agreeing to attend a seminar.

The term "product" will be used herein to refer to all such offerings (e.g., merchandise-type products, services and other offerings).

The product ID number 46A may identify a unique product (e.g., show tickets for row J, seats 1–2). Alternatively, or in addition, the product ID number 46A may identify a group or class of products (e.g., sports apparel, or show tickets).

The price 46B in product database 46 may be used to indicate the price to a customer for a corresponding merchandise item or service, and may also be used to indicate the amount of compensation provided to a player in exchange for the player's acceptance of a condition of an offer (e.g., switching telephone service providers).

Figure 5:
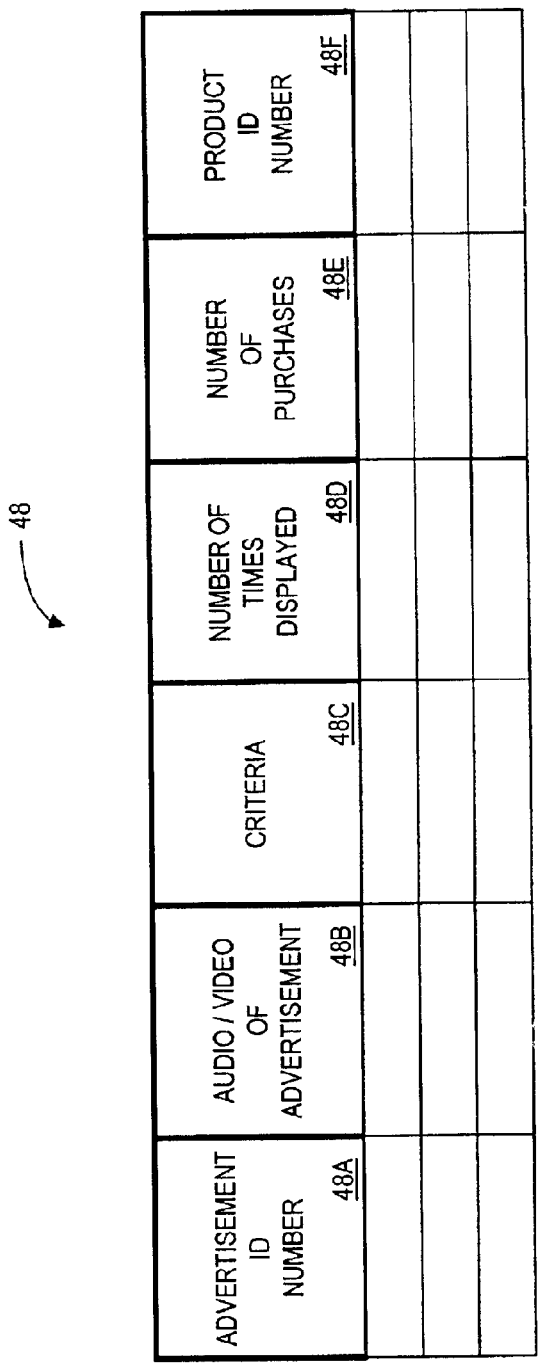
FIG. 5 is a schematic diagram of an advertising database.

Advertising database 48 is shown in FIG. 5 and includes an advertisement ID number 48A; an audio/video presentation of the advertisement 48B; criteria 48C; number-of-times displayed indicator 48D; a number-of-purchases 48E; and one or more product ID numbers 48F.

The criteria 48C in advertising database 48 is preferably a code (or codes) that identifies which set or subset of slot machines are to receive an advertisement. For example, certain advertisements could be shown to slot machines that require, for example, a dollar or more for each play. In another example, certain advertisements may only be shown to machines that are playable for less than a dollar per play.

In other examples, any slot machine which has been continuously played by a player for a predetermined period of time can be supplied with particular advertisements. Advertisements for certain products of a certain value or price level can be targeted to a player in accordance with the player's assigned status number 44J. In another example, an advertisement could be transmitted to a slot machine whose output data indicates a player win. In yet another example, an advertisement could be transmitted to a slot machine whose output data indicates a player loss.

According to other various embodiments, information about product inventory may be used by network server 12 in determining to send a particular advertising message to a slot machine. For example, a particular advertisement may be sent to a slot machine if the quantity remaining of a corresponding product is above a predetermined threshold. This would assist the casino in managing the product inventory. According to another embodiment, criteria 48C might specify that an advertisement is to be transmitted based on player preferences 44K (or other information about the player). For example, a sports-related advertisement might only be sent to machines with players who have indicated a preference for such offers.

The number-of-times displayed 48D and number-of-purchases 48E in advertising database 48 are used for later analysis of the effectiveness of the advertisement. The number-of-times displayed 48D and number-of-purchases 48E may be used in determining which advertisements to provide.

The one or more product ID numbers 48F correspond to the merchandise, services, and/or offerings being offered in the advertisement. A particular product may be associated with more than one advertisement. Also, a particular advertisement may offer more than one product to the player.

While the audio/video presentation of the advertisement is shown as being contained within advertising database 48, a value inserted into database 48 may also be a pointer to a further on-line video or audio player that is responsive to the pointer and other control data to provide a desired presentation.

Figure 6:
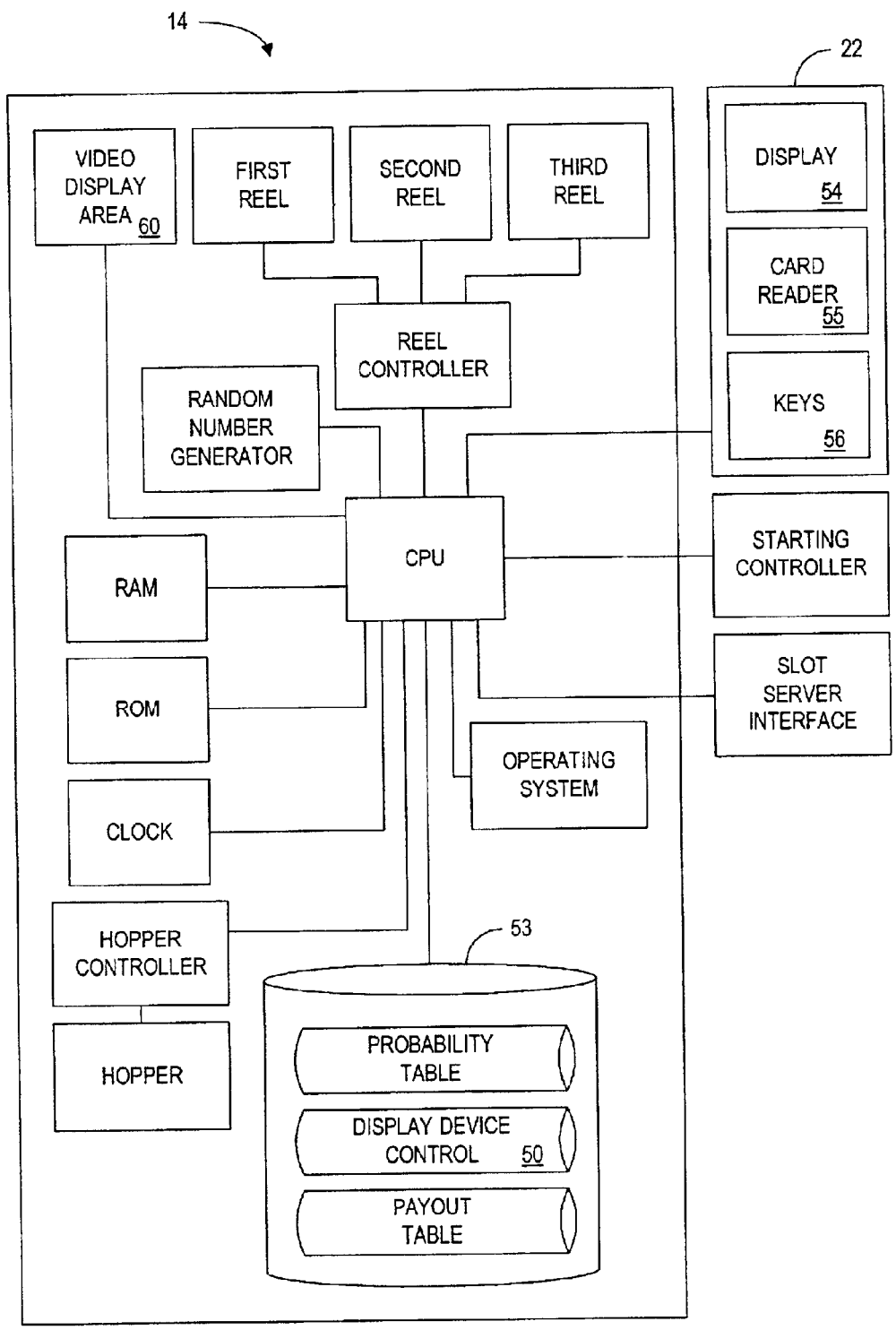
FIG. 6 is a high-level block diagram of a slot machine.

Turning now to FIG. 6, a block diagram of a slot machine 14 is illustrated. Slot machine 14 is configured in a manner known in the prior art, except for the inclusion of an interactive display 22 and a display control procedure 50 contained within a resident data storage device 53. Interactive display device 22 includes a display 54, a card reader 55 and keys 56 ("soft" or "hard") for enabling a player to input data into slot machine 14. A video display area 60 may also be present in slot machine 14, but may not be accessible to external control by network server 12. If this is the case, display 54 is used to display downloaded product/product purchase information and further messages to the player. Otherwise, the provision of display 54 may not be necessary. Each of the remaining submodules within slot machine 14 is known to those skilled in the art and requires no detailed discussion.

Display control procedure 50 is called into action when a product/product purchase advertising message is received from network server 12 to enable display of the message by display 54. Further, display control procedure 50 controls the operation of interactive display device 22, including card reader 55 and keys 56. When a player inputs a selection or other data via keys 56, such an entry is recognized by display control procedure 50, which causes the resident CPU in slot machine 14 to configure the entered data for transmission over bus system 20 (via the slot/network sever interface) to network server 12.

Figure 7:
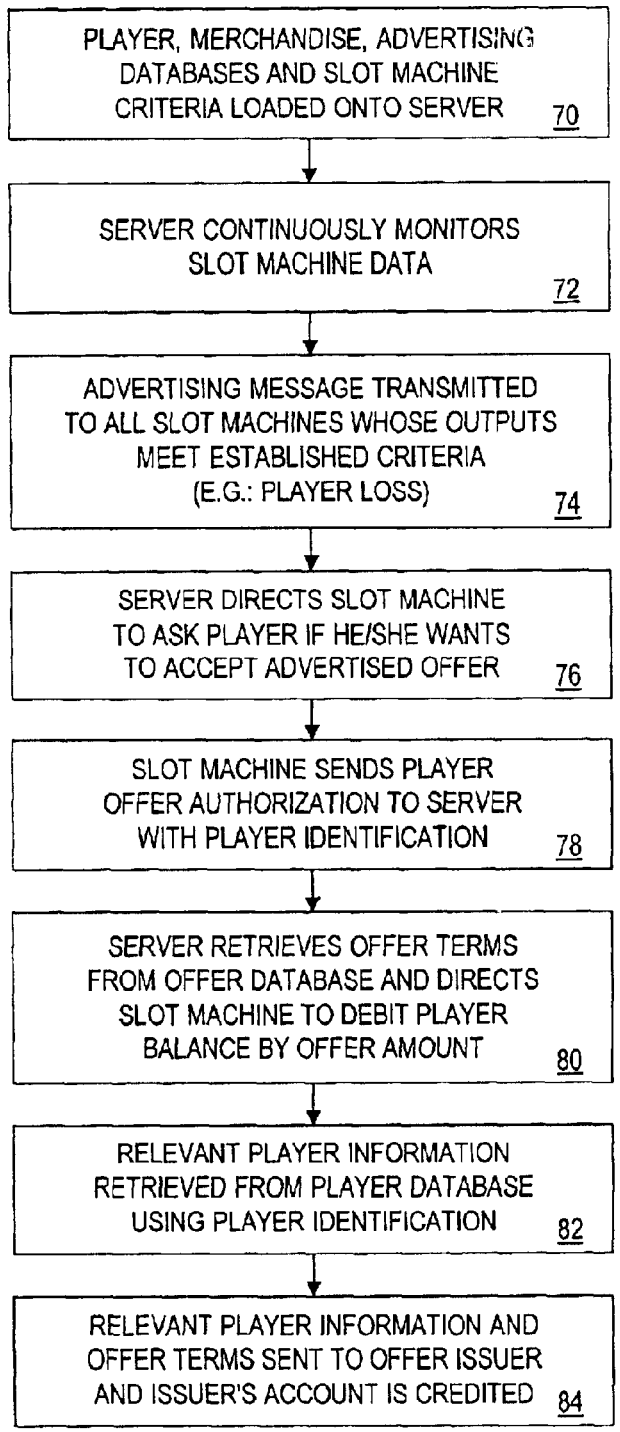
FIG. 7 illustrates a logic flow diagram of an advertising process.

Turning now to FIG. 7, the operation of the invention will be described. Initially, network server 12 has had loaded and stored therein player database 44, product database 46, advertising database 48, offer status database 100, and criteria (box 70). Such stored databases and resident transaction processor routine 42 (FIG. 2) enable network sever 12 to selectively provide advertising messages to individual slot machines 14, 16, and 18. Alternatively, the stored databases and criteria are not stored in network server 12, but are stored in a medium in communication with network server 12.

Thereafter, network server 12 monitors and analyzes data that is fed from the connected slot machines (box 72). Such data may include information about a respective slot machine (e.g., denomination of slot machine), information about a respective player (e.g., player identifier) and/or information about respective game play (e.g., outcome of a play).

After receiving the slot machine data, network server 12 transmits product advertisement/pricing data to any one or more slot machines whose output data meets one or more established criteria (box 74).

For instance, a certain product advertisement may be provided to all slot machines that require one dollar or more per play. Further, any slot machine which has been continuously played by a player for a predetermined period of time can be supplied with a subset of advertisements. According to other various embodiments, advertisements of certain price level products/services can be targeted to a player in accordance with the player's assigned status number 44J. Such status number 44J is input to the slot machine by insertion of the user's card in to the card reader at the start of play. For example, the player may have a status number that indicates she is a guest of the casino hotel, or is a frequent slot machine player. Such status number 44J is input to the slot machine by insertion of the user's card in to the card reader at the start of play. According to other embodiments, certain advertisements can be targeted to a player in accordance with the player's preferences 44K. According to another example, an advertisement is transmitted to a slot machine which indicates to network sever 12 that a player win has occurred which requires a monetary payout to the player. In another example, an advertisement could be transmitted to any slot machines whose output data meets the criterion of a player loss.

If one or more criteria are met, network server 12 will send a message to the respective slot machine, which asks if the player wishes to purchase advertised goods for a displayed price (box 76). Such a message will appear on display 54 within interactive display module 22.

According to an alternative embodiment, more than one message is sent to the respective slot machine.

If the player sends a purchase confirmation to network sever 12 (box 78), it is also preferably accompanied by a player ID number which is stored both locally in slot machine 14 and in network server 12. This will enable a confirming message to be transmitted to display 54 indicating the name of the purchase, for confirmation purposes.

Thereafter, network server 12 retrieves the price of the product 46B from product database 46 and, if a win occurred, directs slot machine 14 to pay out the amount of the win, less the purchase price of the product. If the purchase price is greater than the amount of the payout, the player's credit balance is debited by the amount of the purchase. Further, the credit balance 44F maintained by network sever 12 is likewise debited (box 80). Thereafter, the player address 44D is retrieved from player database 44, based upon the player ID number (box 82). The player address 44D and purchase information are then sent to a dispatching function where the goods are shipped to the player and network server 12 then credits the manufacturer's account with a payment amount (box 84).

The latter action assumes that the manufacturer's account is maintained locally. The system may also be configured to initiate a transfer of funds to the manufacturer's account in a banking establishment via a wire transfer.

If the player sends a purchase confirmation to network server 12 evidencing acceptance of a product "switch" offer (e.g., from one telephone supplier to another), server 12 retrieves the amount to be credited to the player, credits the player's account and so notifies the slot machine. If the account is also maintained at the slot machine, it too is credited. The credited amount may be tagged so that it is only useful for play of the slot machine, or it can actually be paid out, to be later billed to the player if the player reneges.

While not shown in FIG. 7, further control features can be implemented under control of transaction processor routine 42. For instance, the player, by agreeing to have an advertisement shown at his/her slot machine, can be targeted to enjoy incremental benefits such as higher payouts, or free slot pulls. Transaction processor routine 42 can also enable players to disable the advertising message, should they so desire. Further, a corporate sponsor can arrange for extra prizes to be available to be awarded to players with certain pre-specified status numbers (e.g., employees) in the player database.

Finally, the product to be advertised at the time of a monetary payout can be chosen in conformance with the amount of the payout so as to enable the amount of the payout to at least cover the cost of the purchase.

Thus, according to various embodiments of the present invention, advertising can be provided to gaming devices and a player is allowed to respond to and benefit from such advertising messages. Services may be provided to players, based upon intelligent conclusions regarding characteristics of the player and a matching thereof to offered products and services. According to various embodiments of the present invention, advertising, product, and/or pricing information may be provided to slot machine players, wherein the information is intelligently chosen based upon various criteria, such as conditions at the slot machine, and/or characteristics of the player.

According to various alternative embodiments, information about product inventory may be used by network server 12 in determining to send a particular advertising message to a slot machine. For example, a particular advertisement may be sent to a slot machine if the quantity remaining of a corresponding product is above a predetermined threshold. This would assist the casino in managing the product inventory.

According to various alternative embodiments, advertisements may be analyzed based on their effectiveness with a particular player or with all players to whom they have been provided. For example, the number-of-times displayed 48D and number-of-purchases 48E in advertising database 48 may be used in determining which advertisements are more effective. Advertising messages may thus be transmitted (box 74) based on an assessment of their effectiveness.

Figure 8A:
FIG. 8A is a schematic diagram of an offer status database.

Offer status database 100 is shown in FIG. 8A, and includes a player identifier 100A; offer instance identifier 100B; advertisement identifier 100C; player response 100D; balance adjustment amount 100E; and payment amount 100F. Offer status database 100 preferably is used to track all offers made to all players, but may be limited to a subset of players and/or offers.

Player identifier 100A identifies a player to whom an advertisement has been provided, and preferably corresponds to player ID number 44C in player database 44. Offer instance identifier 100B identifies an instance that an advertisement identified by advertisement identifier 100C was provided to the player identified by player identifier 1000A. Player response 100D preferably contains an indication of whether the player accepted the offer in the advertisement, refused the offer, or deferred the offer until a later time. Player response 100D may also indicate whether the player expressed a preference (or dislike) for the advertisement, and whether the player desires to receive similar advertisements. Balance adjustment amount 100E contains the amount by which the player's balance is credited or debited, depending on the type of offer. For example, if the advertisement is for a switch offer, balance adjustment amount 100E preferably will indicate the amount by which the player's balance will be credited. If the advertisement is for a merchandise item, balance adjustment amount 100E preferably indicates the amount by which the player's balance will be debited. Payment amount 100F preferably stores the amount that the casino receives if the player accepts the offer (e.g., from a third-party merchant who sponsored a switch offer) or the amount that the casino pays to a sponsor of an offer (e.g., a manufacturer of a purchased product).

Figure 8B:
FIG. 8B is a schematic diagram of an alternative embodiment of an offer status database.

Alternative (or supplemental) offer status database 120 is shown in FIG. 8B, and is preferably used to track all offers made to a particular player. Alternative offer status database 120 may be used in addition to, or as an alternative to, offer status database 100. Offer instance identifier 120A, advertisement identifier 120B, player response 120C, balance adjustment amount 120E, and payment amount 120F correspond to data in offer status database 100 described above. Alternative offer status database 120 also preferably includes a response time 120D, which indicates a date and/or time at which the player responded to the advertisement.

According to various embodiments, information such as that contained in offer status database 100 and alternative offer status database 120 may be used to determine which advertisement(s) to send to a particular slot machine(s). For example, for a particular player, network server 12 may determine that the player tends to refuse offers provided during a particular time period. In another example, network server 12 may determine that the player tends to accept certain types of offers. For instance, a player might respond more favorably to audio and video content than just video content, or might respond more favorably to sports-related advertisements.

According to various embodiments of the present invention, data corresponding to the information of one or more of transaction processor routine 42, player database 44, merchandise database 46, advertising database 48, and offer status database 100, are stored in a memory (e.g., resident data storage device 53) of representative slot machine 14. Thus, the slot machine 14 may perform some or all of the functions of network server 12. For example, a transaction processor routine (not shown) at slot machine 14 may monitor the slot machine data, determine an appropriate advertising message from an advertising database (not shown) at the slot machine 14, and send offer authorization to network server 12, which then retrieves relevant player information from player database 44 and concludes the transaction as described above. Of course, other combinations of functions and distributions of information among server and slot machine(s) are possible. Any information stored at the slot machine 14 may be periodically refreshed, for example, by the network server 12. Similarly, information stored at the slot machine 14 may be used to periodically refresh, for example, information stored at the network server 12.

According to various embodiments of the present invention, a network server provides control functions for gambling devices of the type that provide intermittent monetary payments to players at a point-of-play. The point-of-play includes an interactive display device for displaying messages to the player and for receiving player responses, which are then transmitted to a network server. Memory at the network server stores product and product purchase information as well as customer profile data. The network server causes transmission of product and product purchase information to the interactive display device and monitors each of the gambling devices to detect an occurrence of a player win that requires a monetary payout. The network server is responsive to the detection of the player win, to an entry from the player that indicates the purchase of a product (as offered by a locally displayed advertisement), and to pay out the amount of the win less the purchase price of the product. The network server is also controlled to display selected subsets of product and product purchase information in accord with player characteristic data that is input by the player at the gambling device.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scoped of the appended claims.

We claim:

1. A method comprising:

determining data associated with a gaming device;

determining whether the data meets at least one established criterion; and providing an offer to a player if the data meets the at least one established criterion, the offer including a condition and an amount of credit to be provided to the player in exchange for the player agreeing to the condition.

2. The method of claim 1, in which providing comprises:

displaying the offer at the gaming device.

3. The method of claim 1, in which the data includes an indication of at least one of:

a loss by the player, a win by the player, a payout, a player status, a denomination requirement of the gaming device, a period of time for which the player has been playing, and an agreement by the player to receive at least one offer.

4. The method of claim 1, in which providing the offer comprises:

transmitting the offer to the gaming device.

5. The method of claim 1, in which providing the offer comprises:

displaying the offer to the player.

6. The method of claim 1, further comprising:

receiving an indication of acceptance by the player of the offer; and providing the amount of credit to the player.

7. The method of claim 6, in which providing the amount of credit comprises:

determining a balance associated with the player; and adjusting the balance based on the amount of credit.

8. The method of claim 6, in which providing the amount of credit comprises:

dispensing the amount of credit to the player.

9. The method of claim 1, in which the condition requires that the player switch from a first provider of a service to a second provider of the service.

10. The method of claim 1, in which the condition requires that the player switch from a first provider of telephone service to a second provider of telephone service.

11. The method of claim 1, in which the condition requires that the player switch from a first provider of credit to a second provider of credit.

12. The method of claim 1, in which the condition requires that the player switch from a first credit card issuer to a second credit card issuer.

13. The method of claim 1, in which the condition requires that the player switch from a first provider of cable television service to a second provider of cable television service.

14. The method of claim 1, in which the condition requires that the player switch from a first provider of Internet service to a second provider of Internet service.

15. The method of claim 1, in which the condition requires that the player establish a credit card account.

16. The method of claim 1, in which the condition requires that the player take out a loan.

17. The method of claim 1, in which the condition requires that the player establish an account with a provider of telephone service.

18. The method of claim 1, in which the condition requires that the player establish an account with a provider of cable television.

19. The method of claim 1, in which the condition requires that the player establish an account with a provider of Internet service.

20. The method of claim 1, in which the condition requires that the player attend a seminar.

21. The method of claim 1, in which the condition requires that the player speak with a sales representative.

22. The method of claim 1, in which the amount of credit is valid only for play of a gaming device.

23. The method of claim 1, further comprising:
billing the player for the amount of credit if the player fails to satisfy the condition.

24. The method of claim 1, further comprising:
storing the indication of acceptance by the player of the offer.

25. The method of claim 1, further comprising:
providing a benefit to the player if the player has agreed to receive at least one offer.

26. The method of claim 25, in which the benefit comprises a higher payout.

27. The method of claim 25, in which the benefit comprises a free game at the gaming device.

28. The method of claim 27, in which the gaming device comprises a slot machine, and
in which the benefit comprises a free slot pull.

29. A method comprising:
providing to a player an offer for an amount of compensation in exchange for the player agreeing to switch from a first provider of a service to a second provider of the service,
in which the player is associated with a gaming device;
receiving an indication of acceptance by the player of the offer;
determining a balance associated with the player; and
crediting the balance based on the amount of compensation.

30. The method of claim 29, further comprising:
determining an occurrence of a win by the player.

31. The method of claim 30, in which providing comprises:
providing the offer in response to determining the occurrence of the win.

32. The method of claim 30, in which crediting comprises:
crediting the balance in response to determining the occurrence of the win.

33. The method of claim 29, further comprising:
determining an occurrence of a loss by the player.

34. The method of claim 33, in which providing comprises:
providing the offer in response to determining the occurrence of the loss.

35. The method of claim 33, in which crediting comprises:
crediting the balance in response to determining the occurrence of the loss.

36. The method of claim 29, farther comprising:
debiting an account associated with the second provider by the amount of compensation after receiving the indication of acceptance of the offer.

37. A method comprising:
monitoring respective data associated with each slot machine of a plurality of slot machines;
determining whether the respective data for each slot machine of the plurality of slot machines indicates a player loss;
transmitting a respective advertising message to each slot machine for which the respective data indicates a player loss, the advertising message comprising an offer;
receiving an indication of acceptance by a player of the offer;
determining an offer amount associated with the offer;
determining a balance associated with the player; and
debiting the balance by the offer amount.

38. The method of claim 37, further comprising:
determining an issuer of the offer;
determining player data associated with the player;
transmitting the player data to the issuer;
determining an account associated with the issuer; and
crediting the account by a payment amount.

39. A method comprising:
monitoring respective data associated with each slot machine of a plurality of slot machines;
determining whether the respective data for each slot machine of the plurality of slot machines indicates a player loss;
transmitting a respective advertising message to each slot machine for which the respective data indicates a player loss, the advertising message comprising a switch offer;
receiving an indication of acceptance by a player of the offer;
determining an offer amount associated with the offer;
determining a balance associated with the player; and
crediting the balance by the offer amount.

40. A method comprising:
determining data associated with a slot machine;
determining whether the data indicates a loss by a player;
transmitting an offer to the slot machine if the data indicates a loss by the player;
receiving an indication of acceptance by the player of the offer;
determining an amount associated with the offer;
determining a balance associated with the player; and
crediting the balance by the amount.

* * * * *